(No Model.)  5 Sheets—Sheet 1.

J. C. WANDS.
APPARATUS FOR MAKING GAS.

No. 335,405. Patented Feb. 2, 1886.

WITNESSES
Phil C Masi.
Ben Fergitt

INVENTOR
John C. Wands
By his Attorneys
Anderson Smith (No Model.) 5 Sheets—Sheet 2.

J. C. WANDS.
APPARATUS FOR MAKING GAS.

No. 335,405. Patented Feb. 2, 1886.

WITNESSES
Phill° Masi.
B. Furgitt

INVENTOR
John C. Wands
By his Attorneys
Anderson & Smith (No Model.) 5 Sheets—Sheet 3.
J. C. WANDS
APPARATUS FOR MAKING GAS.
No. 335,405. Patented Feb. 2, 1886.
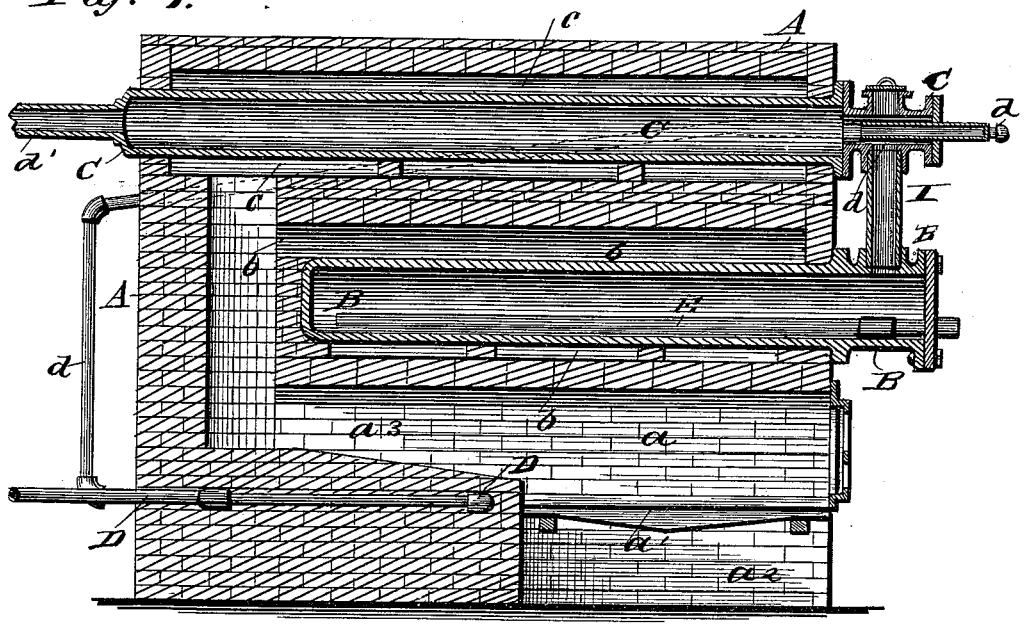
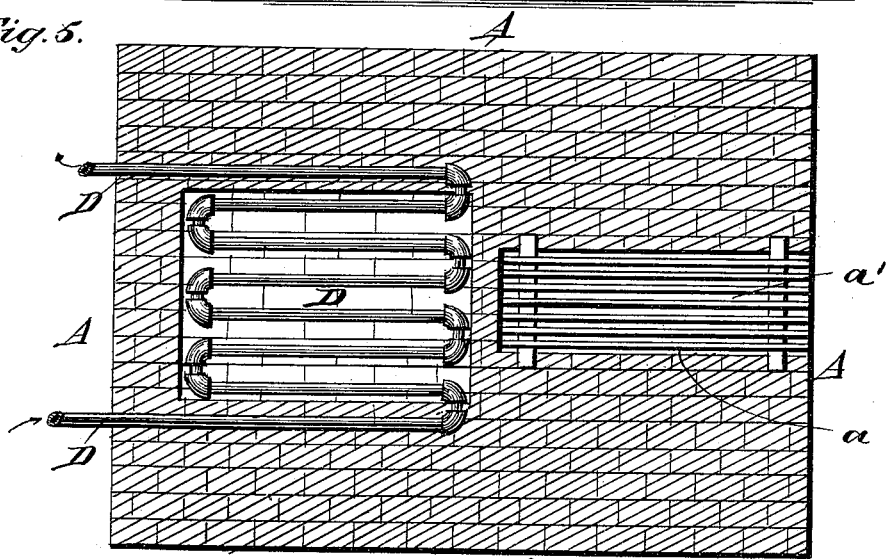
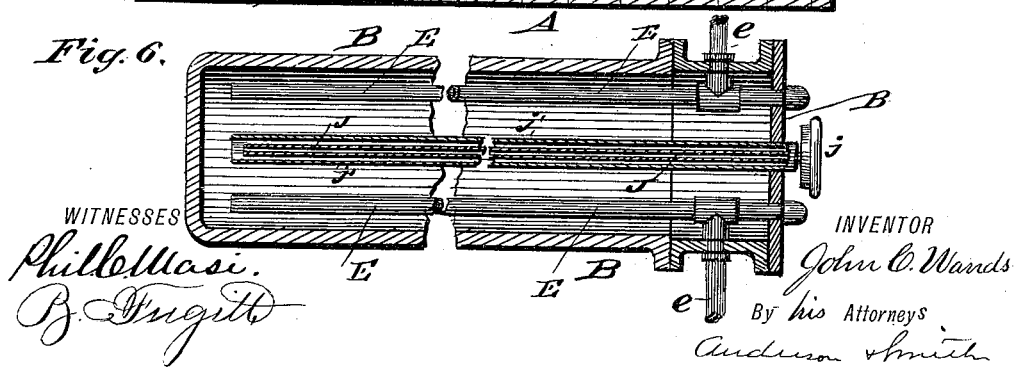
WITNESSES
INVENTOR
John C. Wands
By his Attorneys
Anderson & Smith (No Model.) 5 Sheets—Sheet 4.
J. C. WANDS.
APPARATUS FOR MAKING GAS.
No. 335,405. Patented Feb. 2, 1886.
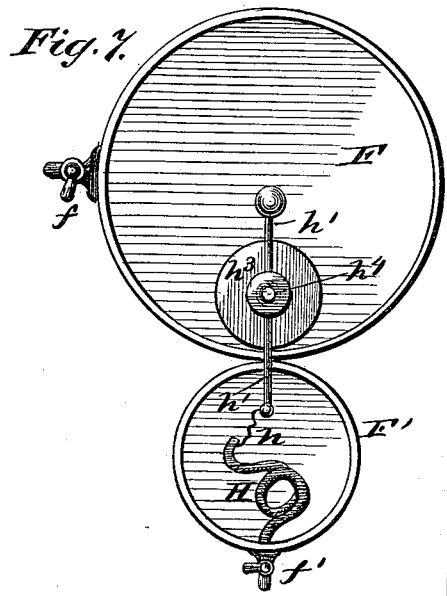
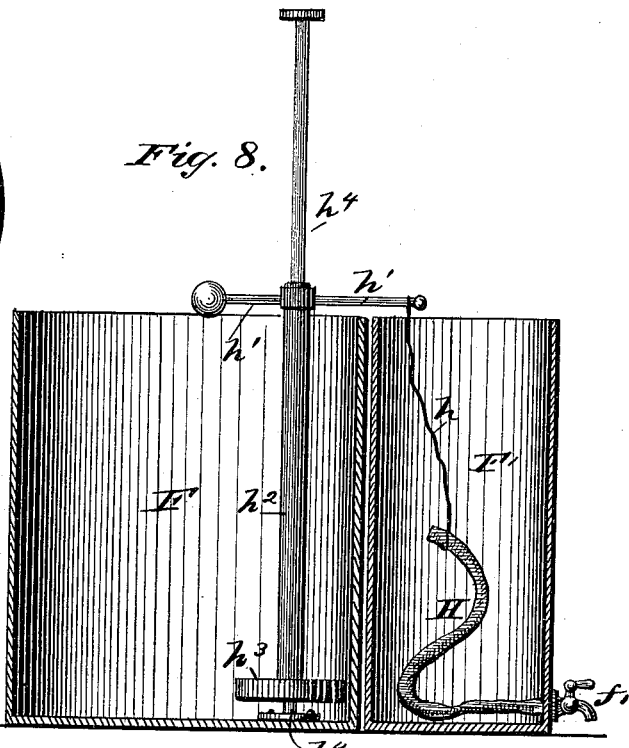
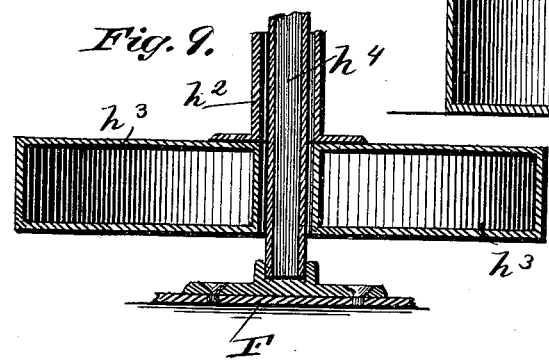
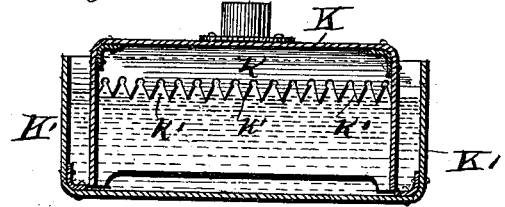
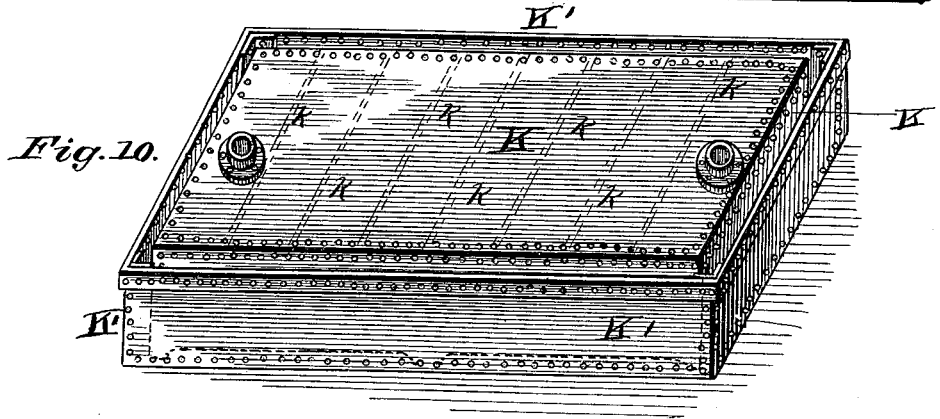
WITNESSES
Phil C Mass.
Ben Fugitt
INVENTOR
John C. Wands
By his Attorneys
Anderson Smith (No Model.) 5 Sheets—Sheet 5.

J. C. WANDS.
APPARATUS FOR MAKING GAS.

No. 335,405. Patented Feb. 2, 1886.

WITNESSES
Phil C. Masi.
Ben Frigitt.

INVENTOR
John C. Wands
By his Attorneys
Anderson Smith

UNITED STATES PATENT OFFICE.

JOHN CLARK WANDS, OF ST. LOUIS, MISSOURI.

APPARATUS FOR MAKING GAS.

SPECIFICATION forming part of Letters Patent No. 335,405, dated February 2, 1886.

Application filed October 24, 1885. Serial No. 180,861. (No model.)

*To all whom it may concern:*

Be it known that I, JOHN C. WANDS, a citizen of the United States, residing at St. Louis, in the county of St. Louis, and State of Missouri, have invented certain new and useful Improvements in Apparatus for Making Gas; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
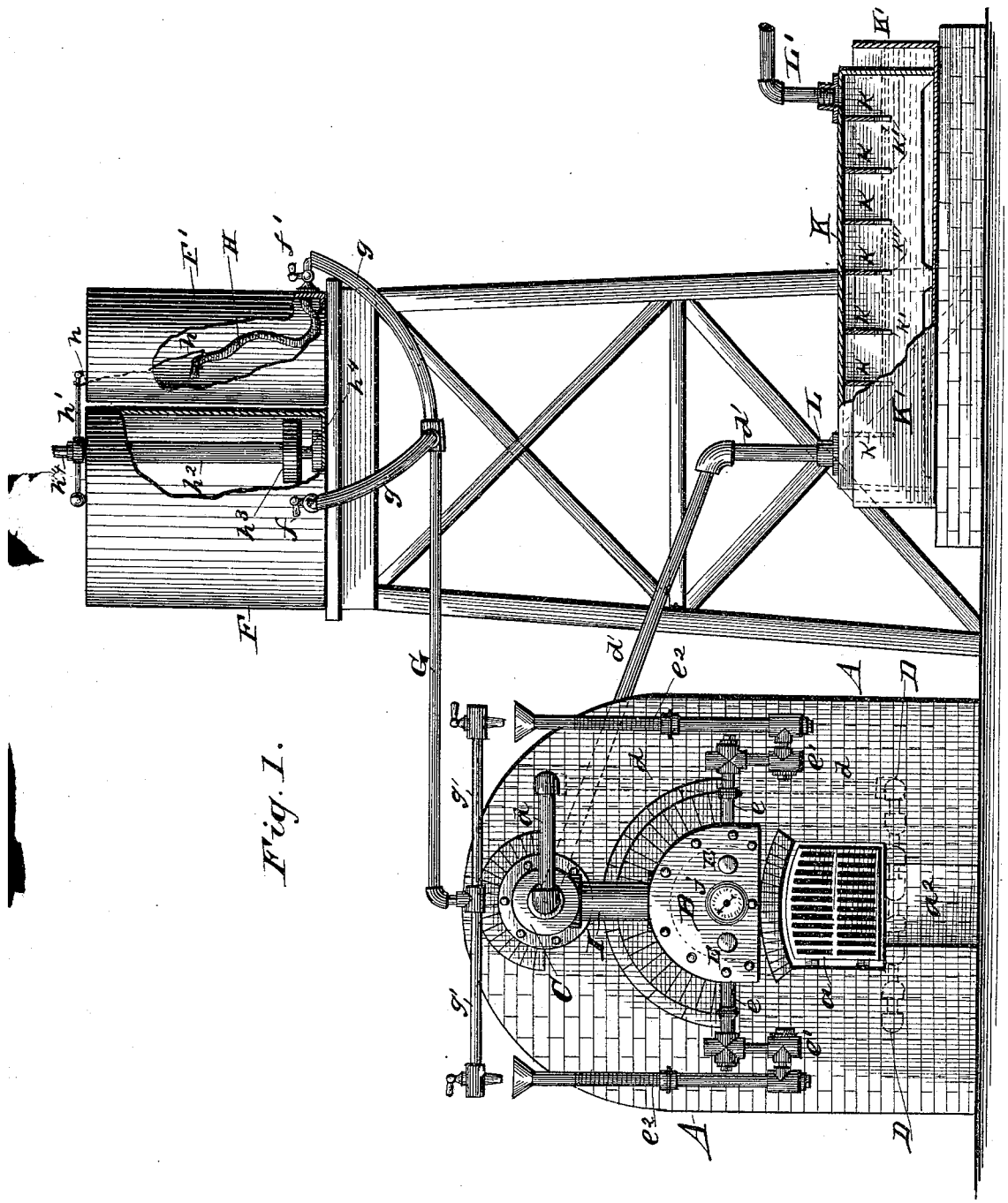
Figure 3:
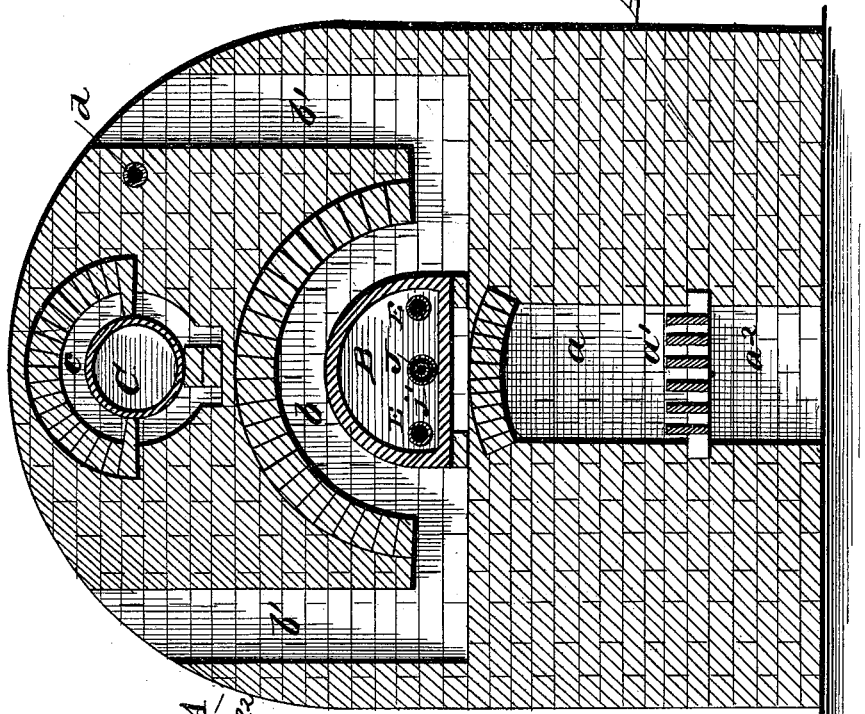
Figure 2:
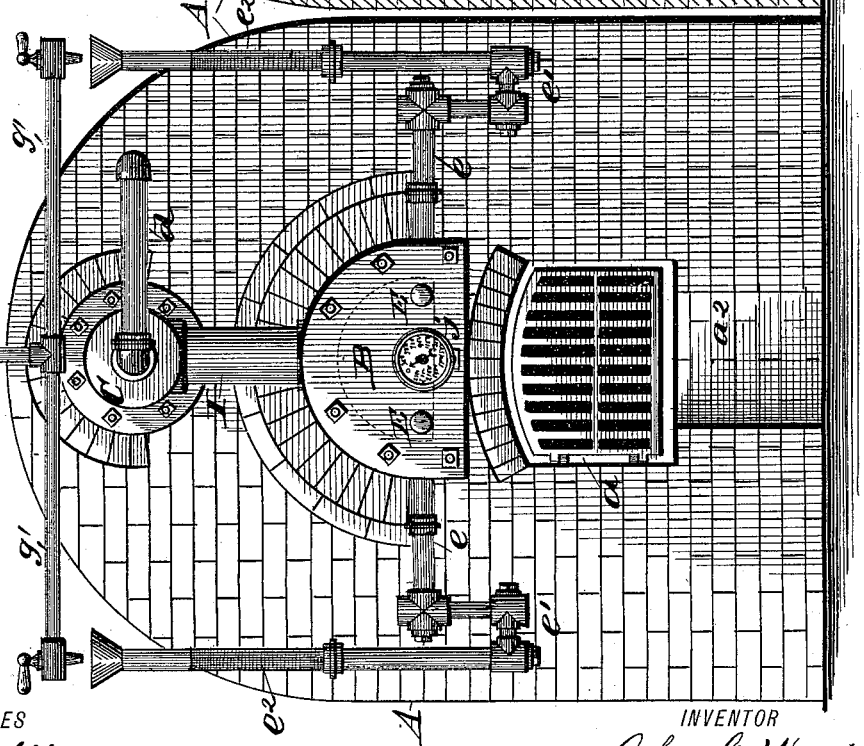
Figure 12:
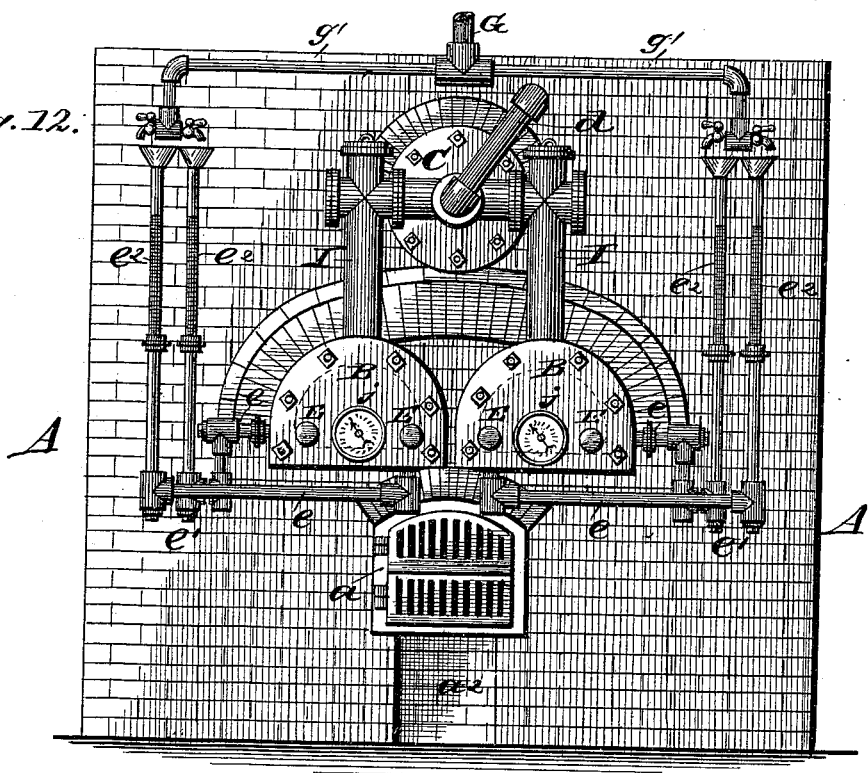
Figure 13:
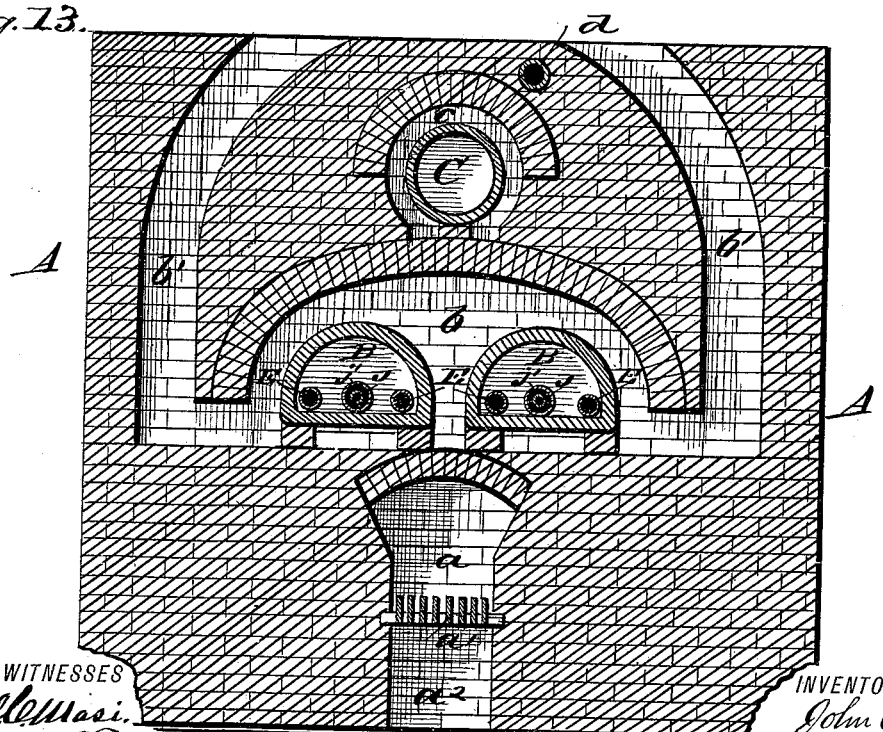

Figure 1 of the drawings is a side elevation of the apparatus complete. Fig. 2 is an end elevation of one of the furnaces and retorts. Fig. 3 is a transverse vertical section of the same. Fig. 4 is a vertical longitudinal section. Fig. 5 is a horizontal section of the same. Fig. 6 is an enlarged horizontal section of the retort. Fig. 7 is a plan view of the oil and water tanks. Fig. 8 is a vertical section of the same. Fig. 9 is an enlarged section of the float. Fig. 10 is a sectional view of the float and a portion of the oil-tank. Fig. 11 is a transverse section of the water-tank. Fig. 12 is a side elevation of a modification, showing two retorts; and Fig. 13 is a transverse section of the same.

This invention relates to improvements in apparatus for making gas from oil, water, and hot air; and it consists in the construction and novel arrangement of parts, as hereinafter set forth, and pointed out in the appended claims.

Referring to the accompanying drawings by letter, A designates the brick-work sustaining the retort, mixing-chamber, and some other parts of the apparatus, the retort being designated by B, and the mixing-chamber by C.

$a$ is the fire-box below the retort; $a'$, the grate, and $a^2$ the ash-pit, as shown.

$a^3$ is a flue running back from the fire-box, and then turning vertically to communicate with the rear ends of an oven or hot-air space, $b$, surrounding the top and sides of the retort, and of a hot-air space, $c$, entirely surrounding the mixing-chamber.

$b'$ $b'$ are smoke-flues running out laterally from each side of the oven $b$ near its front end, and then bending vertically to open on the top of the brick-work A, as shown.

D is a return-bend coil of pipe situated in the brick-work to the rear of the grate and below the flue $a^3$. The entrance end of the coil connects with a blower of proper construction, which drives in the cold air. The latter is heated in the coil, and passes through the exit end of the coil, to be driven into the front end of the mixing-chamber, the pipe $d$ running from said exit end, passing forward, and entering the head-plate of the mixing-chamber through an air-tight joint, as shown.

$d'$ is a pipe passing out of the rear end of the mixing-chamber, and running to a cooling-tank, hereinafter described.

E E are pipes for mixed oil and water, running longitudinally within the retort, on each side of the same, near its bottom. The pipes E are open at their rear ends, and pass through air-tight joints in the front or head plate of the retort.

$e$ $e$ are transverse branch pipes, which pass out laterally on each side from the pipes E, through the sides of the part of the retort which projects forward out of the brick-work A. The pipes $e$ have connected to their outer ends the traps $e'$, the outer vertical legs of which are coupled to the vertical glass tubes $e^2$, having their upper ends funnel-shaped. The purpose of the glass tubes is to watch and control the feed of the mixed oil and water, the mixture being in the ratio of about four parts of oil to one of water.

The tubes $e^2$ are fed by the following apparatus: F and F' are respectively an oil and a water tank, the former of about four times the capacity of the latter. The tanks are provided with valves $f$ $f'$, respectively, each of which discharges into one bifurcation, $g$, of a supply-pipe, G, which runs above and in front of the brick-work A and bends downward in the central vertical plane of the same. The lower end of the tube G connects with the center of a transverse pipe, $g'$, at the ends of which are discharge-cocks, which stand above the funnel-shaped upper ends of the glass tubes $e^2$, so as to discharge therein.

The water and oil are fed from the tanks by gravity, and the mechanism by which four parts of oil are fed to one part of water is as follows: The valve $f'$ connects on the interior of the tank F' with the flexible tubing H, the upper end of which is open, and connected by a cord or wire, $h$, to the end of one arm of the cross-bar $h'$, which is secured to the upper end of the sliding tube $h^2$, the outer arm of the bar $h'$ being weighted to counterbalance the flexible tubing and cord. The tube $h^2$ has on its lower end the float $h^3$, (preferably a hollow metal box,) which slides on the vertical rod $h^4$, the foot of which is screwed to the floor of the oil-tank F, as shown. The oil-tank having four times the capacity of the water-tank, and the levels of the water and oil being such that when the float is sustained by the oil, the mouth of the flexible tube is at the level of the water, it is evident that as the oil feeds out the water will so feed out that the same distance between the levels of the two will be maintained; else, if the water fed out too fast, its level would fall below the mouth of the flexible tube and its feed would stop.

I is a vertical pipe connecting the top of the front end of the retort with the bottom of the front end of the mixing-chamber, which projects outside of the brick-work A, so that the volatilized oil and water can be drawn up from the former into the latter.

J is a pyrometer-pipe, which has a dial, $j$, on its front end outside of the head of the retort and slides longitudinally in the retort, passing into a pipe, $j'$, which has its front end secured around a proper opening in the head of the retort and its rear end closed.

The pyrometer-dial is arranged to register from about 300° to 2,000°.

The cold-water tank for cooling the gas flowing out of the mixing-chambers is as follows:

K is a rectangular tank, closed at top but open at the bottom, and fixed within the larger tank, K', closed at the bottom but open at the top. The tank K is provided with the equidistant transverse partial partitions $k$, which depend from its roof, and have their lower edges provided with the V-shaped notches $k'$, the points of which are made circular.

L is the gas-entrance pipe in the roof of the tank K, outside of the partition nearest one end, and L' is the gas-exit pipe in the roof of said tank, outside the partition nearest the other end. The entrance-pipe connects with the pipe $d'$ from the rear end of the mixing-chamber, and the pipe L' connects with an ordinary gas-holder. It is evident that the gas flowing through the cooling-tank must pass under each of the partitions $k$, so that by filling the tank K', to greater or less height, so as to more or less uncover the notches $k'$, the gas will be compelled in passing under the partitions to pass through more or less water, and be therefore cooled more or less rapidly.

If desired, two retorts may be used with only one mixing-chamber, as shown in the drawings.

The process of manufacturing the gas is as follows: A fire is made with any proper fuel in the furnace and when the pyrometer indicates the desired temperature in the retort the mixed oil and water are fed with the latter in such quantities as to become properly volatilized. Then the blower is caused to drive hot air through the mixing-chamber, and the blast draws up through the pipe I the volatilized oil and water, which mix with the hot air, forming gas. The latter then passes through the cooling-tank to the gas-holder, as described.

Having described this invention, what I claim, and desire to secure by Letters Patent, is—

1. The combination of the retort to volatilize the oil and water, the oil and water supply pipes extending into the retort, the mixing-chamber having communication therewith near its front end, and the hot-air coil taking its current of air from a blower and delivering the same into the front end of and through the mixing-chamber, thereby causing the volatilized oil and water to be drawn up and mixed with the hot air, forming gas, substantially as specified.

2. In an apparatus to form gas from hot air, water, and oil, the combination of the mixing-chamber, the air-pipe connecting with the said chamber, the retort communicating therewith, the pipes for mixed oil and water entering the retort and having outside of the same the traps and upwardly-extending arms, and apparatus, substantially as described, to feed the mixed oil and water into said upwardly-extending arms and thence into the retort, substantially as specified.

3. In an apparatus to make gas from oil, water, and hot air, the combination, with the retort, substantially as described, to volatilize mixed oil and water, of the pipe $j'$, having its front end secured around an opening in the head of the retort and its rear end closed, and the pyrometer-tube J, sliding in the tube $j'$, and carrying the dial $j$ on its front end, substantially as specified.

4. The combination of the retort, the mixing-chamber having its front end connected with the front end of the retort, the pipes for mixed oil and water running into the retort and trapped and connected with the glass tubes on the outside of the same, the oil and water tank, substantially as described, each feeding into one arm, $g$, of a pipe, G, connecting with a transverse pipe, $g'$, which feeds at both ends into the glass tubes, and a cooling-tank, substantially as described, connected to the rear end of the mixing-chamber by the pipe $d$, substantially as specified.

5. In an apparatus for making gas from oil, water, and hot air, the combination of the retort to volatilize mixed oil and water, the pipes to feed mixed oil and water trapped on the outside of the retort and provided with the vertical glass tubes, the feeding-pipes $g'$ and G, the water-tank F', provided with the valve $f'$, the oil-tank F, provided with the valve $f$, the flexible tubing H, connected by a cord to the cross-bar $h'$, the sliding tube $h^2$, having said cross-bar on its upper end and the float $h^3$ on its lower end, and the vertical rod $h^4$, having its foot secured to the floor of the oil-tank, and upon which the tube $h^2$ slides, substantially as specified.

In testimony whereof I affix my signature in presence of two witnesses.

JOHN CLARK WANDS.

Witnesses:
   J. B. QUIGLEY,
   PETER P. DAILEY.